R. J. DEARBORN.
BEARING.
APPLICATION FILED NOV. 13, 1917.
1,391,463.
Patented Sept. 20, 1921.
2 SHEETS—SHEET 2.
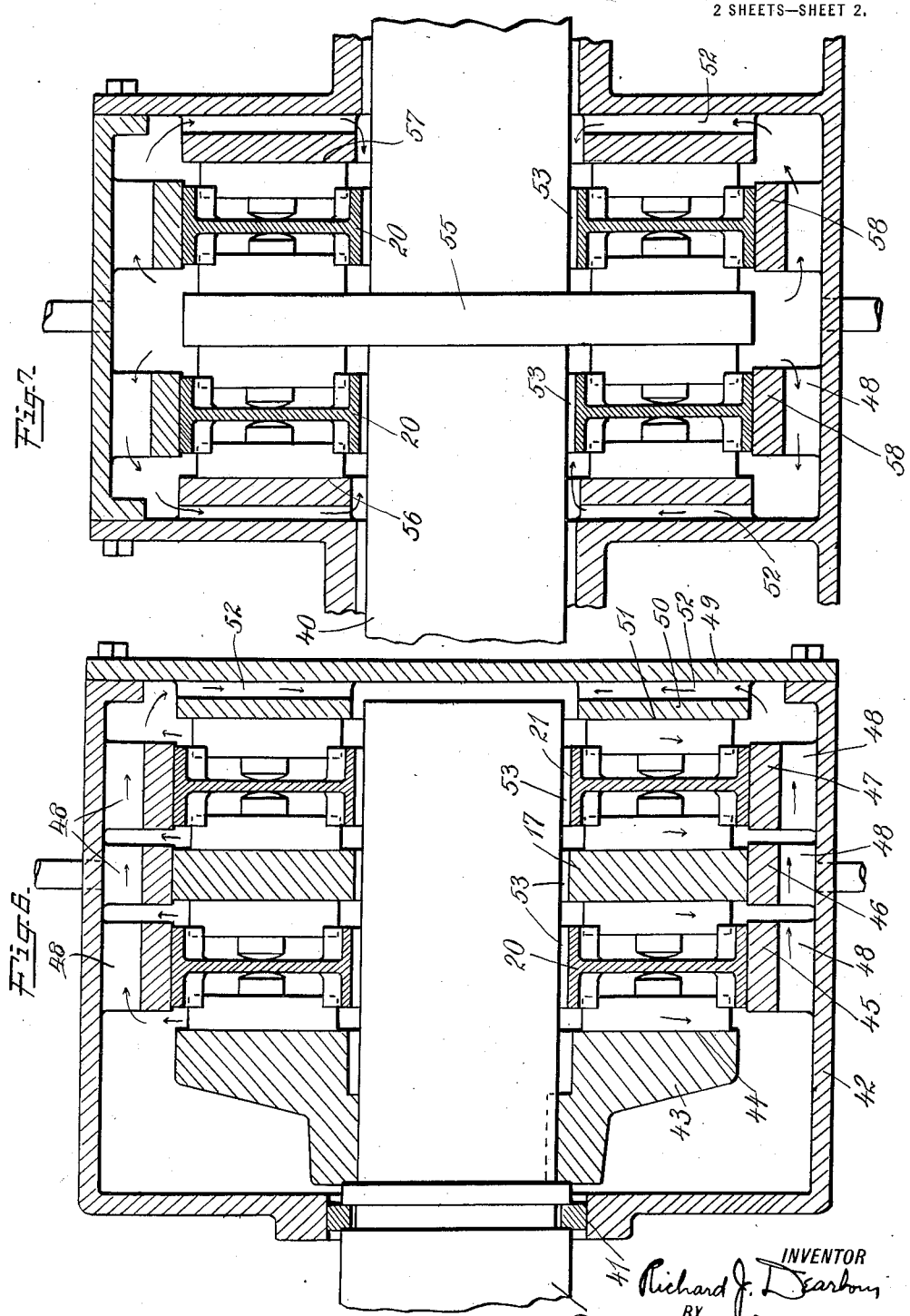
INVENTOR
Richard J. Dearborn
BY
Marshall & Dearborn
ATTORNEYS

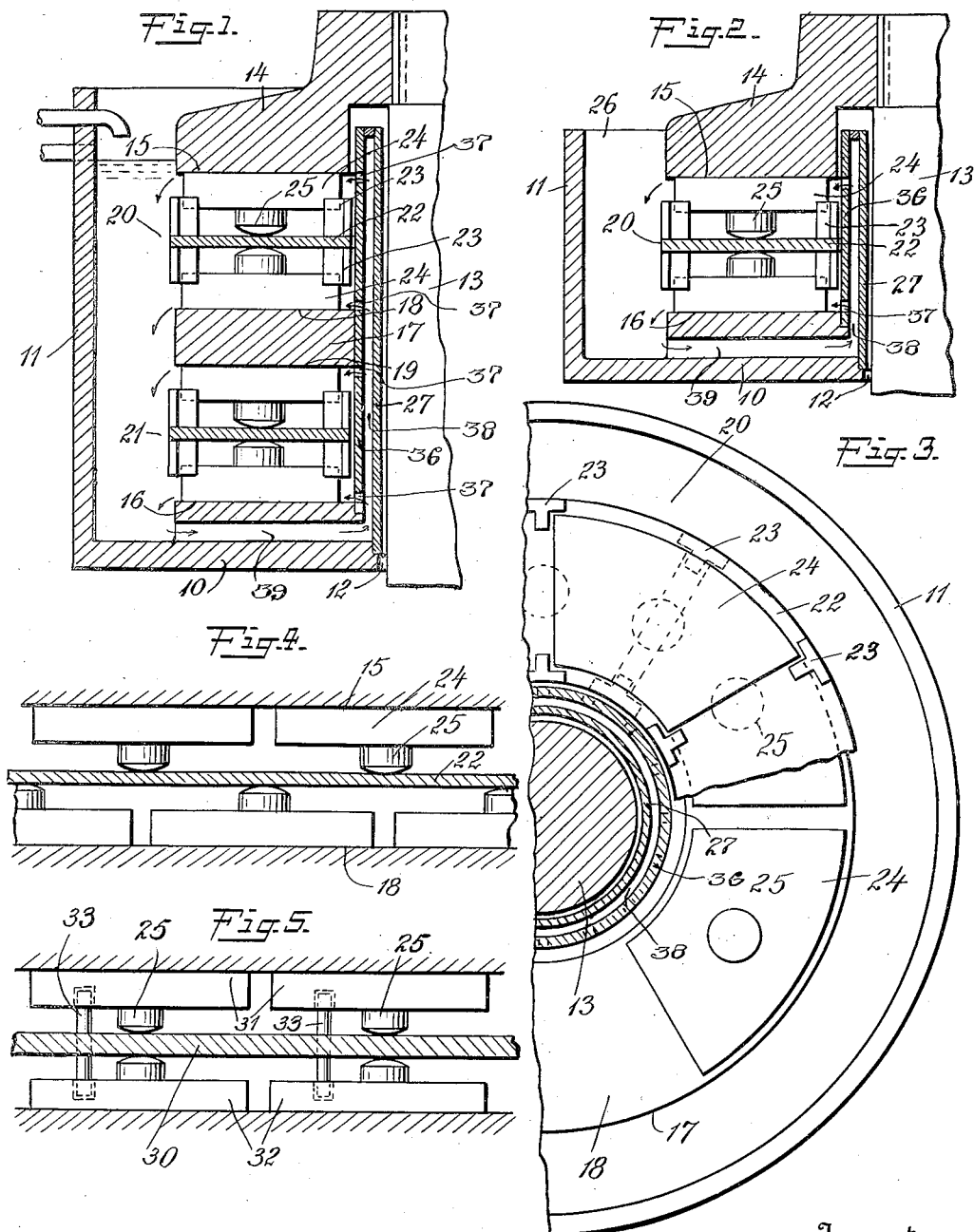

UNITED STATES PATENT OFFICE.

RICHARD J. DEARBORN, OF PLANDOME, NEW YORK, ASSIGNOR TO ALBERT KINGSBURY, OF PITTSBURGH, PENNSYLVANIA.

BEARING.

1,391,463.  Specification of Letters Patent.  Patented Sept. 20, 1921.

Application filed November 13, 1917. Serial No. 201,761.

*To all whom it may concern:*

Be it known that I, RICHARD J. DEARBORN, a citizen of the United States of America, and a resident of Plandomé, Nassau county, and State of New York, have invented certain new and useful Improvements in Bearings, of which the following is a specification, reference being had to the accompanying drawings, forming a part thereof.

My invention relates to bearings and has special reference to structures of the general type described by Albert Kingsbury in his Patents Nos. 947,242, 1,117,499, etc., particularly to bearings of this type which are adapted for use with members rotating at relatively high speed.

One object of my invention is to provide a bearing so constructed that the speed difference at the bearing surfaces is materially less than the difference in speed between the rotating and stationary parts between which the bearing is provided.

Another object of my invention is to provide a thrust bearing employing a floating set of shoes so mounted as to enable said shoes to tilt independently both radially and circumferentially of the axis of the bearing. Another object of my invention is to provide a thrust bearing comprising a floating structure employing a plurality of sets of shoes so mounted as to enable the shoes of each set to tilt both radially and circumferentially of the axis of the bearing and independently of the shoes of the other set.

Yet another object of my invention is to provide improved means for maintaining a continuous circulation of the lubricant, such means also preferably serving as a guide or centering means for certain elements of the bearing.

In order that my invention may be thoroughly understood I will now proceed to describe the same in the following specification and then point out the novel features thereof in appended claims.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring to the drawings:

Figure 1 is a partial sectional elevation of a thrust bearing structure arranged and constructed in accordance with my invention, and constituting an embodiment thereof.

Fig. 2 shows a slightly modified structure which also embodies my invention, and Fig. 3 is a partial sectional plan view of the bearings shown in Figs. 1 and 2.

Fig. 4 is a sectional detail of the same bearings.

Fig. 5 corresponds to Fig. 4 but shows a modified bearing structure which also embodies my invention.

Figs. 6 and 7 are longitudinal sections showing slightly different horizontal-shaft bearing structures which constitute embodiments of my invention.

Referring first to Figs. 1 to 4 inclusive, 10 designates a base having an outer wall or flange 11 and a central hole or opening 12 through which a shaft 13 extends. A thrust block 14 is affixed to the shaft near its upper end and has an annular bearing surface 15.

The base 10 has a thrust bearing surface 16 which is opposite the bearing surface 15. Interposed between these surfaces is a floating bearing ring 17 having bearing surfaces 18 and 19.

A pair of similar bearing members 20 and 21 are interposed respectively between the surfaces 15 and 18 and between the surfaces 16 and 19. Since the members 20 and 21 are alike, only one will be described.

In the form shown member 20 comprises an annular shoe cage 22 having a plurality of lugs 23 and associated with said shoe cage are a plurality of tiltable bearing shoes 24. Each of the bearing shoes has an axially extending projection 25 with a spherical or rounded end which is mounted on the adjacent surface of the cage 22 whereby each shoe may tilt universally. The projections 23 constitute corner pieces for the shoes 22, which have the form of ring sectors, the shoes being loosely fitted between the projections as clearly shown in Fig. 3. One set of projections engages the top of the cage 22 and the other set engages the bottom of said cage, the shoes being mounted with their bearing surfaces outward, so that they coöperate respectively with the bearing surfaces 15 and 18.

The bearing surfaces of the shoes which form parts of the member 21 similarly cooperate with the surfaces 16 and 19.

Since the bearing shoes are tiltably mounted they assume slightly tilted positions under the wedging action of the oil when the bearing is in operation, the oil being contained in the annular reservoir or chamber 26 formed by the outer wall or flange 11 of the base and a sleeve 27 which loosely surrounds the shaft 13 and is also secured to the base. The arrangement of parts is such that the oil level in the chamber is maintained so as to flood all of the bearing surfaces.

Within the chamber 26 in the form shown and spaced at a short distance from the sleeve 27 is an annular plate or sleeve 36 which is perforated at 37 opposite each of the bearing surfaces and is joined to the sleeve 27 at the top, the parts being so arranged that an annular oil passage 38 is formed. The base 12 is provided with radial apertures forming passages 39 which connect the body of the oil chamber 26 with the lower end of the passage 38.

The floating bearing ring 17 is rotatively mounted on the annular plate 36 as are also the bearing members 20 and 21. The plate 36 therefore is an oil guard and also constitutes a guide or bearing for the ring 17 and cages 22 so that all the parts of the bearing which are directly interposed between the bearing surfaces 15 and 16 are free to rotate about the center of the shaft as an axis.

If the shaft is rotating at high speed the difference in speed between the bearing surfaces 15 and 16 and the adjacent shoe surfaces will be relatively low, because the bearing member 21 will rotate about the shaft at a low speed, the bearing ring 17 at a slightly higher speed, and the bearing member 20 at a still higher speed.

The bearing may be simplified, as shown in Fig. 2, by omitting one of the bearing members and ring 17 and interposing only one bearing member such as the member, 20, directly between the bearing surfaces 15 and 16. The structures are alike except that the floating bearing ring 17 and one of the shoe structures are omitted, and corresponding parts are designated by the same reference characters. Also, the number of interposed bearing members and rotatable rings could be increased without departing from the spirit of my invention.

It is evident that the bearing shoes may be tiltably supported on the cages in any suitable manner. In order to equalize the pressure on the bearing shoes the shoe cage preferably comprises a yielding or resilient ring, the shoes on opposite sides being offset with reference to each other as clearly shown in Fig. 4. Consequently, the ring may yield or bend circumferentially when the pressure is applied and equitable distribution of pressure on the several shoes is obtained.

Instead of the resilient cage or ring 22, a relatively rigid ring 30 may be employed as shown in Fig. 5. The shoes 31 and 32 may be mounted directly opposite each other in this arrangement and dowel pins such as 33 may be substituted for the lugs 23. The shoes are tiltably mounted on the ring and the dowels are loose enough to permit the shoes to tilt both radially and circumferentially of the axis of the bearing and thus to provide for the automatic lubrication of the bearing surfaces when the bearing is in operation.

In order that the bearing surfaces may be automatically lubricated it is necessary to supply the spaces between the shoes with oil. This will be accomplished if the chamber 26 is filled with oil, as indicated in the drawings, to a sufficient level to flood the bearing surface 15. When the bearing is in operation the rotation of the bearing structures 20 and 21 and of the floating bearing ring 17 will throw the oil radially outward, but oil will be supplied through the passages 39—38—37 with the result that a circulation of oil is established as indicated by the arrows in Figs. 1 and 2.

This circulation of oil prevents local heating and tends to reduce the temperature of the body of the oil by increasing its radiation.

Referring now to Fig. 6, 40 designates a horizontal shaft which extends through an opening 41 in a bearing housing 42 and has a thrust collar 43, which corresponds to the block 14 and has a thrust bearing surface 44.

In the form here shown, a plurality of guide rings 45—46—47 are mounted concentrically with the shaft 40 within the housing. They may be integral with the housing and connected with its outer walls by webs forming oil passages 48. The housing has an end cap or plate 49 having an annular projection 50 provided with a thrust surface 51 which is opposite the surface 44. The cap or plate 49 is shown as recessed to provide radial oil passages 52.

A floating bearing ring 17 and bearing structures 20 and 21 are interposed between the surfaces 44 and 51 as in the structure of Fig. 1, but in this arrangement they are rotatively mounted within the respective guide rings 46—45—47. Their inside diameters are larger than the outside diameter of the shaft so that there are narrow oil passages 53 close to the shaft connecting with the passages 52.

The bearing-housing 42 is filled with oil to above the level of the bearing-shoes and the arrangement of parts is such that when the bearing is in operation oil moves radially outward between the shoes by reason of the centrifugal action, then through the passages 48, then inward through the passages 52 and back through the inner passages 53. The circulation of oil is thus maintained.

Fig. 7 shows my invention embodied in a horizontal shaft bearing arranged to support a thrust in either direction. The shaft 40 is here provided with a thrust collar 55 and bearing structures such as 20 are interposed between the respective surfaces of the thrust collar and the opposite thrust surfaces of the housing which are designated 56 and 57. The structures 20 are mounted on guide rings 58 corresponding to the ring 45 of Fig. 6. The circulation of oil is established on each side of the thrust collar as indicated by the arrows, passages 52 being provided at each end of the housing.

While the embodiments of my invention illustrated on the drawings have been described with considerable particularity, it is to be understood that the invention is not limited thereto, as the same is capable of receiving a variety of mechanical expressions some of which will readily suggest themselves to those skilled in the art, while certain parts thereof are capable of use without other parts thereof. Reference is therefore to be had to the appended claims for a definition of this invention.

What I claim is:

1. A thrust bearing comprising opposed bearing surfaces, and an interposed bearing structure including a rotatable carrier and bearing shoes engaging said opposed bearing surfaces and mounted on said carrier to tilt both radially and circumferentially with respect to the axis of the bearing.

2. A bearing comprising opposed bearing surfaces, and an interposed floating bearing structure including an annular member and bearing shoes tiltably mounted on the opposite surfaces thereof.

3. A thrust bearing comprising opposed bearing surfaces, and an interposed floating bearing structure including an annular cage and bearing shoes tiltably mounted in spaced relation on opposite sides of the cage and respectively engaging the opposed bearing surfaces.

4. A thrust bearing comprising opposed bearing surfaces, and an interposed floating bearing structure including an annular cage and bearing shoes tiltably mounted on opposite sides of the cage and respectively engaging the opposed bearing surfaces, said cage being provided with means for holding the shoes in position without preventing their tilting in operation.

5. A thrust bearing comprising opposed bearing surfaces, and an interposed floating bearing structure including an annular cage and bearing shoes tiltably mounted on opposite sides of the cage and respectively engaging the opposed bearing surfaces, said cage being provided with lugs for spacing the shoes and maintaining a predetermined relation between them.

6. A thrust bearing comprising a pair of spaced bearing surfaces, a rotatable intermediate ring having opposite bearing surfaces, and floating bearing members including bearing-shoes mounted to tilt both radially and circumferentially with respect to the axis of the bearing interposed between each of said spaced bearing surfaces and the adjacent surface of the rotatable ring.

7. A thrust bearing comprising a pair of spaced bearing surfaces, a rotatable intermediate ring having opposite bearing surfaces, and interposed floating bearing members between each of said spaced bearing surfaces and the adjacent surface of the rotatable ring, each of said floating bearing members comprising an annular member and bearing shoes tiltably mounted on the opposite surfaces thereof.

8. A thrust bearing comprising a pair of spaced bearing surfaces, a rotatable intermediate ring having opposite bearing surfaces, and interposed floating bearing members between each of said spaced bearing surfaces and the adjacent surface of the rotatable ring, each of said floating bearing members comprising an annular cage having spacing lugs extending outwardly therefrom in opposite directions and bearing shoes tiltably mounted on opposite sides of the cage and held in position by said lugs.

9. A bearing comprising bearing surfaces and an interposed floating bearing structure comprising a yielding carrier and bearing shoes mounted on the opposite sides thereof.

10. A thrust bearing comprising bearing surfaces and an interposed floating bearing structure comprising a resilient ring and a plurality of bearing shoes tiltably mounted on the opposite sides of the ring, the shoes on opposite sides being offset relative to each other.

11. A thrust bearing comprising opposed bearing surfaces and an interposed floating bearing structure including bearing shoes engaging said opposed bearing surfaces and mounted to tilt both radially and circumferentially with respect to the axis of the bearing.

12. A thrust bearing comprising opposed bearing surfaces and an interposed floating bearing structure including an annular member and bearing shoes mounted on opposite sides thereof to tilt both radially and circumferentially with respect to the axis of the bearing.

13. A thrust bearing comprising opposed bearing surfaces and an interposed floating bearing structure including an annular member and bearing shoes tiltably mounted on the opposite sides thereof, the shoes on either side of said member being mounted to tilt independently of the shoes on the other side of said member.

14. A thrust bearing comprising opposed bearing surfaces and an interposed floating bearing structure including two sets of tiltably-mounted bearing shoes engaging the respective bearing surfaces, the shoes of each set being mounted to tilt both radially and circumferentially with respect to the axis of the bearing.

15. A thrust bearing comprising opposed bearing surfaces and an interposed floating bearing structure including two sets of tiltably-mounted bearing shoes engaging the respective bearing surfaces, the shoes of each set being mounted to tilt universally and independently of the shoes of the other set.

16. A thrust bearing comprising opposed bearing surfaces and an interposed floating bearing structure including two sets of tiltably-mounted bearing shoes engaging the respective bearing surfaces, the shoes of each set being mounted to tilt both radially and circumferentially with respect to the axis of the bearing and independently of the shoes of the other set.

17. A thrust bearing comprising opposed bearing surfaces and an interposed floating bearing structure including an annular member and bearing shoes provided with projections having spherical surfaces engaging the opposite sides of said member.

18. A thrust bearing comprising opposed bearing surfaces and a floating bearing structure between said bearing surfaces including an annular member and bearing shoes universally pivoted thereon and each engaging only one of said bearing surfaces.

19. A thrust bearing comprising opposed bearing surfaces and an interposed floating bearing structure including two sets of universally tiltable bearing shoes respectively arranged to engage the respective bearing surfaces.

20. A thrust bearing comprising opposed bearing surfaces and an interposed floating bearing structure including a flexible carrier and bearing shoes engaging said bearing surfaces and mounted on the carrier to tilt both radially and circumferentially with respect to the axis of the bearing.

21. A thrust bearing comprising a rotatable shaft having a thrust collar, a relatively stationary thrust bearing member, an oil-retaining sleeve on the stationary member surrounding the shaft, a sleeve spaced from the retaining sleeve, and oil passages in the stationary bearing member communicating with the space between said sleeves, said second sleeve having perforations through which oil is discharged to the bearing surfaces.

22. A thrust bearing comprising a shaft having a rotatable thrust collar, a relatively stationary bearing member, an oil-retaining sleeve on the stationary member surrounding the shaft, floating bearing elements interposed between the thrust collar and the stationary bearing member, and means for guiding the floating bearing elements and coöperating with said sleeve to provide an annular oil passage.

23. A thrust bearing comprising a shaft having a rotatable thrust collar, a relatively stationary bearing member, an oil-retaining sleeve on the stationary member surrounding the shaft, floating bearing elements interposed between the thrust collar and the stationary bearing member, and a perforated sleeve spaced from the oil-retaining sleeve and constituting a guide for the floating bearing elements and an oil guard.

24. A thrust bearing comprising relatively rotatable bearing members having opposed bearing surfaces, an interposed floating bearing member, and an annular oil guard adapted to deliver oil to the bearing surfaces and to center the floating bearing member.

25. A thrust bearing comprising relatively rotatable bearing members having opposed bearing surfaces, an interposed floating bearing member, and an annular oil guard arranged to constitute a centering support for the floating bearing member and having oil discharge passages opposite the bearing surfaces.

26. A thrust bearing comprising relatively rotatable bearing members having opposed bearing surfaces, an interposed floating bearing member, an annular oil reservoir in which the bearing members are disposed, and a sleeve arranged to center the floating bearing member and spaced from the inner wall of the oil reservoir to provide an oil passage, said sleeve being perforated opposite the bearing surfaces.

27. A thrust bearing comprising relatively rotatable bearing members having opposed bearing surfaces, one of said members having oil passages in the rear of the bearing surface thereof, an annular floating bearing member interposed between said opposed bearing surfaces, a sleeve within the floating bearing member, and an oil-retaining wall within the sleeve arranged to form therewith an oil passage to which oil is supplied by said passages and from which oil is supplied to the bearing surfaces.

28. A thrust bearing comprising rotatable and stationary bearing members having opposed bearing surfaces, an oil reservoir in which said bearing members are disposed and comprising an inner sleeve, a second sleeve surrounding said inner sleeve and constituting therewith an oil passage radially inward of said bearing surfaces, said second sleeve having apertures for delivering oil to said bearing surfaces, and means of communication between said oil-reservoir and said passage.

29. A thrust bearing comprising rotatable and stationary bearing members having opposed bearing surfaces, a floating bearing member between said bearing surfaces, an oil reservoir in which said bearing members are disposed and comprising an inner sleeve, a second sleeve surrounding said inner sleeve and constituting a centering means for said floating bearing member, said sleeves providing an oil passage therebetween positioned radially inward of said bearing surfaces and said second sleeve having apertures for delivering oil to said bearing surfaces, and means of communication between said oil-reservoir and said passage.

30. A bearing comprising a shaft having a rotatable bearing surface, a relatively stationary bearing surface, an oil-retaining sleeve surrounding the shaft, and a second sleeve spaced from said first sleeve and providing an oil-passage therebetween, said second sleeve having apertures through which oil is delivered to the bearing surfaces.

31. A thrust bearing comprising opposed bearing surfaces and an interposed floating bearing structure comprising a flexible annular member and bearing shoes mounted on the opposite sides of said member in engagement with said opposed bearing surfaces.

32. A thrust bearing comprising opposed bearing surfaces and an interposed floating bearing structure comprising a flexible annular member and bearing shoes tiltably mounted on the opposite sides of said member.

33. A thrust bearing comprising opposed bearing surfaces and an interposed floating bearing structure comprising a flexible annular member and bearing shoes tiltably mounted on the opposite sides of said member, the shoes on either side of said member being mounted to tilt independently of the shoes on the opposite side of said member.

34. A thrust bearing comprising opposed bearing surfaces and an interposed floating bearing structure comprising a flexible annular member and bearing shoes mounted on the opposite sides of said member in offset relation with respect to each other.

35. A thrust bearing comprising opposed bearing surfaces and an interposed floating bearing structure including an annular member and bearing shoes mounted on the opposite faces of said member in engagement with said opposed bearing surfaces.

36. A thrust bearing comprising a pair of spaced bearing surfaces, a rotatable intermediate ring having opposite bearing surfaces, and interposed floating bearing members between each of said spaced bearing surfaces and the adjacent surface of the rotatable ring, each of said floating bearing members comprising two sets of tiltably-mounted bearing segments engaging the respective bearing surfaces.

37. A thrust bearing comprising a pair of spaced bearing surfaces, a rotatable intermediate ring having opposite bearing surfaces, and interposed floating bearing members between each of said spaced bearing surfaces and the adjacent surface of the rotatable ring, each of said floating bearing members comprising two sets of tiltably-mounted bearing shoes, the shoes of each set being mounted to tilt independently of the shoes of the other set.

In witness whereof, I have hereunto set my hand this 12th day of November, 1917.

RICHARD J. DEARBORN.